US011234154B2

(12) United States Patent
Yang (10) Patent No.: US 11,234,154 B2
(45) Date of Patent: Jan. 25, 2022

(54) METHOD FOR CONFIGURING NEIGHBORING CELL, NETWORK DEVICE AND USER EQUIPMENT

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/897,147

(22) Filed: Jun. 9, 2020

(65) Prior Publication Data

US 2020/0305015 A1 Sep. 24, 2020

Related U.S. Application Data

(63) Continuation of application No. PCT/CN2018/073377, filed on Jan. 19, 2018.

(51) Int. Cl.
*H04W 24/10* (2009.01)
*H04W 36/00* (2009.01)

(52) U.S. Cl.
CPC ....... *H04W 24/10* (2013.01); *H04W 36/0061* (2013.01)

(58) Field of Classification Search
CPC .............. H04W 24/10; H04W 36/0058; H04W 36/0061; H04W 36/0072; H04W 36/0077
See application file for complete search history.

(56) References Cited

U.S. PATENT DOCUMENTS 9,294,970 B1 3/2016 Sitaram et al.
2011/0237258 A1\* 9/2011 Nylander ............. H04J 11/0093
455/437

(Continued)

FOREIGN PATENT DOCUMENTS

CN 103581998 A 2/2014
CN 105307149 A 2/2016
WO 2017121618 A2 7/2017

OTHER PUBLICATIONS

Huawei. Hisilicon. "Automatic Neighbor Relation in NR" 3GPP TSG-RAN WG2 #99bis R2-1710543, Sep. 29, 2017 (Sep. 29, 2017), sections 2.1 and 2.3.

(Continued)

*Primary Examiner* — Dinh Nguyen
(74) *Attorney, Agent, or Firm* — Perkins Coie LLP (57) ABSTRACT

Disclosed are a method for configuring a neighboring cell, a network device, a user equipment and a computer storage medium. The method comprises: receiving reporting information, sent by a user equipment (UE), of a target cell corresponding to a measurement frequency point, the reporting information of the target cell at least containing identity information and attribute information of an NSA cell and/or an SA cell, the NSA cell and/or the SA cell both being cells not in a neighbouring cell list of an LTE cell, the LTE cell being a cell managed by a network device; on the basis of the report information, adding the corresponding identity information and attribute information of the NSA cell and/or the SA cell to the neighboring cell list.

17 Claims, 2 Drawing Sheets

```
┌─────────────────────────────────────────────────────────┐ ╱ 101
│ Receive report information, sent by a user equipment (UE), of a target │
│        cell corresponding to a measurement frequency                    │
└─────────────────────────────────────────────────────────┘
                              │
                              ▼
┌─────────────────────────────────────────────────────────┐ ╱ 102
│ Add identification information and attribute information corresponding │
│   to a non-stand-alone (NSA) cell and/or a stand-alone (SA) cell into a │
│        neighboring cell list based on the report information            │
└─────────────────────────────────────────────────────────┘
```

(56) References Cited

U.S. PATENT DOCUMENTS

| | | | | |
|---|---|---|---|---|
| 2012/0257602 A1* | 10/2012 | Takahashi | ......... | H04W 36/0061 370/336 |
| 2017/0111886 A1* | 4/2017 | Kim | ...................... | H04W 48/14 |
| 2019/0261236 A1* | 8/2019 | Wang | .................... | H04W 36/30 |
| 2019/0357095 A1* | 11/2019 | Pakniat | ............. | H04W 36/0083 |

OTHER PUBLICATIONS

International Search Report in the international application No. PCT/CN2018/073377, dated Oct. 11, 2018.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP TS 36.300 VI4.5.0 (Dec. 2017), http://www.3gpp.org.
"3rd Generation Partnership Project; Technical Specification Group Radio Access Network; Evolved Universal Terrestrial Radio Access (E-UTRA) and NR; Multi-connectivity;Stage 2(Release 15)", 3GPP TS 37.340 V15.0.0 (Dec. 2017), http://www.3gpp.org.
Written Opinion of the International Search Authority in the international application No. PCT/CN2018/073377, dated Oct. 11, 2018.
Ericsson: "ANR for NSA NR", 3GPP Draft; R2-1704108—ANR for NSA NR, 3rd Generation Partnership Project (3GPP) Mobile Competence Centre; 650, Route Des Lucioles: F-06921 Sophia-Antipolis Cedex; France, vol. RAN WG2, No. Hangzhou, P.R. of China; May 15, 2017-May 19, 2017, May 14, 2017 (May 14, 2017), XP051274716, [ retrieved on May 14, 2017] * p. 2-p. 3*.
Nokia et al: "Cell global identity and ANR functionality", 3GPP Draft; R2-1704331_NR_ANR_Cell ID, 3rd Generation Partnership PROJECT(3GPP), Mobile Competence Centre; 650, Route Des Lucioles; F-06921 Sophia-Antipolis Cedex; France, vol. RAN WG2, No. Hangzhou, China; May 15, 2017-May 19, 2017, May 5, 2017 (May 5, 2017), XP051263783, [ retrieved on May 5, 2017] * p. 4 *.
Vivo: "NR PBCH Content", 3GPP Draft; R2-1706971_PBCH Content, 3rd Generation Partnership Project (3GPP), Mobile Competence Centre; 650, Route Des Lucioles; F-06921 Sophia-Antipolis Cedex; France, vol. RAN WG2, No. Qingdao, China; Jun. 27, 2017-Jun. 29, 2017, Jun. 26, 2017 (Jun. 26, 2017), XP051301468, [ retrieved on Jun. 26, 2017] * p. 3 *.
Supplementary European Search Report in the European application No. 18901288.3, dated Oct. 6, 2020.
Ericsson, SA and NSA indication in CGI reporting, 3GPP TSG-RAN WG2 NR-Ah#1801 R2-1801309, Jan. 12, 2018 (Jan. 12, 2018), section 1-3.
First Office Action of the Chinese application No. 202010423593.8, dated Jun. 8, 2021.
First Office Action of the European application No. 18901288.3, dated May 10, 2021.
First Office Action of the Indian application No. 202027034913, dated Aug. 4, 2021. 6 pages with English translation.
Second Office Action of the Chinese application No. 202010423593.8, dated Oct. 11, 2021. 11 pages with English translation.
Notice of Rejection of the Chinese application No. 202010423593.8, dated Dec. 2, 2021. (10 pages).

* cited by examiner

METHOD FOR CONFIGURING NEIGHBORING CELL, NETWORK DEVICE AND USER EQUIPMENT

CROSS-REFERENCE TO RELATED APPLICATIONS

This is a continuation application of International Patent Application No. PCT/CN2018/073377, filed on Jan. 19, 2018. The entire contents of the above application are incorporated herein by reference in its entirety.

TECHNICAL FIELD

The present invention relates to the field of information processing technology, and in particular to, a method for configuring a neighboring cell, a network device, a user equipment (UE), and a computer storage medium.

BACKGROUND

Configurations and transmissions of a plurality of cell-defining SSBs (synchronization signal blocks) are defined in an entire broadband carrier of a 5G broadband cell. Because a received bandwidth of a UE in idle state is not as large as that of a broadband cell, after finding a cell-defining SSB, the UE in idle state obtains system broadcast information and resides. Therefore, on the entire broadband carrier of the 5G broadband cell, UEs in idle state are randomly distributed over all frequencies where the cell-defining SSBs are located.

An LTE ANR neighboring cell list includes a neighbor relationship of intra-LTE cells and an inter-RAT neighbor relationship. With the deployment of an NR network, NR cells also need to be maintained in the LTE inter-RAT neighbor relationship. However, a current 5G system cell may be missing in the LTE neighboring cell list, and it is impossible to know whether the 5G system cell is a non-stand-alone (NSA) 5G cell or a stand alone (SA) 5G cell.

SUMMARY

In order to resolve the foregoing technical problems, embodiments of the present invention provide a method for configuring a neighboring cell, a network device, a user equipment (UE), and a computer storage medium.

A method for configuring a neighboring cell provided by the embodiments of the present invention is applied to a user equipment, where the method includes:

sending report information of a target cell corresponding to a measurement frequency to a network device corresponding to a Long Term Evolution (LTE) cell, where the report information of the target cell at least includes identification information and attribute information of a non-stand-alone (NSA) cell and/or a stand-alone (SA) cell, and the NSA cell and the SA cell both are cells not in a neighboring cell list of the LTE cell.

A network device is provided by the embodiments of the present invention, where the network device includes: a processor, a memory, and a network interface, where one or more computer programs are stored in the memory and are configured to be executed by the processor, when the one or more computer programs are executed, the processor is configured to:

receive through the network interface, sent by a user equipment (UE), report information of a target cell corresponding to a measurement frequency, where the report information of the target cell at least includes identification information and attribute information of an NSA cell and/or an SA cell, the NSA cell and the SA cell both are cells not in a neighboring cell list of an LTE cell, and the LTE cell is a cell managed by the network device; and add the identification information and the attribute information corresponding to the NSA cell and/or the SA cell into the neighboring cell list based on the report information.

A user equipment is provided by the embodiments of the present invention, where the user equipment includes: a processor, a memory, and a network interface, where one or more computer programs are stored in the memory and are configured to be executed by the processor, when the one or more computer programs are executed, the processor is configured to:

sends, through the network interface, report information of a target cell corresponding to a measurement frequency to a network device corresponding to an LTE cell, where the report information of the target cell at least includes identification information and attribute information of an NSA cell and/or an SA cell, and the NSA cell and the SA cell both are cells not in a neighboring cell list of the LTE cell.

DETAILED DESCRIPTION

In the technical solutions of the embodiments of the present invention, the UE can report, to a network side, a missing neighboring cell that is not configured in the neighboring cell list in a current LTE system, and report an SA indication or NSA indication and identification information of the missing neighboring cell to the network side, so that a network-side LTE system can improve a neighbor relationship of the LTE cell, thereby improving a handover success rate and the configuration rationality of a tight interworking working mode between LTE and NR.

To provide a thorough understanding of the features and technical contents of the embodiments of the present invention, the implementation of the embodiments of the present invention is described in detail below with reference to the accompanying drawings. The accompanying drawings are only used for reference and description but are not intended to limit the embodiments of the present invention.

Embodiment 1

Figure 1:
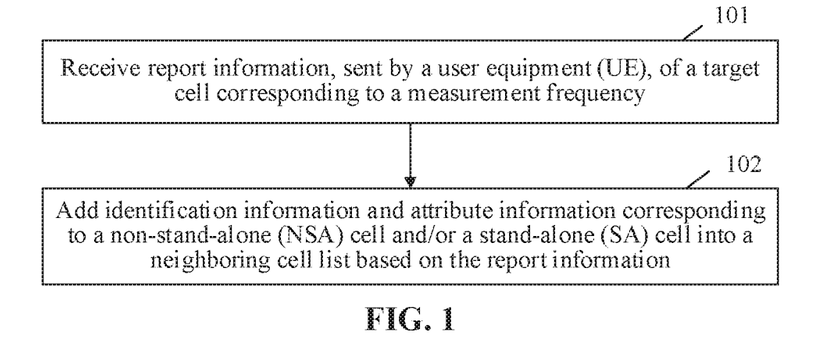
FIG. 1 is a schematic flowchart 1 of a method for configuring a neighboring cell according to an embodiment of the present invention.

This embodiment of the present invention provides a method for configuring a neighboring cell, which is applied to a network device. As shown in FIG. 1, the method includes:

Step 101: Receive report information, sent by a user equipment UE, of a target cell corresponding to a measurement frequency, where the report information of the target cell at least includes identification information and attribute information of an NSA cell and/or an SA cell, the NSA cell and the SA cell both are cells not in a neighboring cell list of an LTE cell, and the LTE cell is a cell managed by the network device.

Step 102: Add the identification information and the attribute information corresponding to the NSA cell and/or the SA cell into the neighboring cell list based on the report information.

Herein, the network device may be a network device managing at least one LTE cell, for example, a base station eNB.

Furthermore, before step 101 is performed, the method further includes:

configuring the measurement frequency to the UE. Specifically, the measurement frequency is configured to the UE by using the LTE cell of the network device, and more specifically, the configured measurement frequency is a frequency of a 5G system. The configured measurement frequency may be a frequency not stored in the neighboring cell list by the network device side of the current LTE cell.

Correspondingly, the UE performs measurement based on the 5G measurement frequency configured by the base station, that is, the LTE cell, and then reports a measurement result to the network device, where the measurement result is included in the report information. Before reporting, the UE may obtain a plurality of cells of the 5G measurement frequency through measurement. The UE screens the plurality of cells and obtains one or more 5G cells with the highest signal strength, and determines whether the one or more 5G cells exist in the neighboring cell list. When the one or more 5G cells do not exist in the neighboring cell list, the UE reports to the network device.

The attribute information includes at least one of the following:

NSA or SA cell indication information of the target cell, information about an interface with a current serving cell, and information about a type of handover with the current serving cell, where the type of handover includes Xn/X2 handover and S1 handover.

The solution is specifically described in the following scenarios:

Scenario 1:

The foregoing steps are performed first, including: configuring, by an LTE base station, the UE to measure a 5G frequency; reporting, by the UE, a measurement result of the 5G frequency, and reporting a cell that has the highest strength and that is not in a neighboring cell list of the LTE base station.

When configuring a measurement for the UE, a base station (that is, the network device) of an LTE cell may configure the UE to perform measurement for the frequency and a physical cell identity (PCI, Physical Cell Identity), and to report an indication of whether the cell is an NSA cell or an SA cell and report a global cell unique identity of the cell.

The UE knows whether the 5G cell is an NSA cell or an SA cell by using the following method: the UE may receive a master information block of the 5G target cell to know whether the 5G cell is an NSA cell or an SA cell. For example, when cell barred in the MIB is set to true, the UE reports an indication indicating that the cell is an NSA cell; if cell barred in the MIB of the target cell is set to false, the UE reports an indication indicating that the cell is an SA cell, and the UE reports a global cell unique identity of the target cell at the same time.

The adding the identification information and the attribute information corresponding to the NSA cell and/or the SA cell into the neighboring cell list includes:

when the LTE cell is a cell supporting dual connectivity and if the report information includes the SA cell, obtaining a global cell unique identity corresponding to the SA cell from the report information, and adding the global cell unique identity of the SA cell into the neighboring cell list; and when the LTE cell is a cell supporting dual connectivity and if the report information includes the NSA cell, obtaining a frequency and a physical cell identity PCI corresponding to the NSA cell from the report information, and adding the frequency and the PCI corresponding to the NSA cell into the neighboring cell list.

That is, if the LTE cell supports EN-DC, the UE reports whether the cell is an SA cell or an NSA cell, and for the SA cell, the UE may report the global cell unique identity. The LTE base station records the SA or NSA indication, the global cell unique identity of the SA cell, and the frequency+ the PCI of the NSA cell into a neighbor relationship.

The adding the identification information and the attribute information corresponding to the NSA cell and/or the SA cell into the neighboring cell list includes:

when the LTE cell is a cell not supporting dual connectivity and if the report information includes the SA cell, obtaining a global cell unique identity corresponding to the SA cell from the report information, and adding the global cell unique identity of the SA cell into the neighboring cell list; and when the LTE cell is a cell not supporting dual connectivity and if the report information includes the NSA cell, skipping storing information of the NSA cell.

That is, if the LTE cell does not support EN-DC, the UE reports whether the cell is an SA cell or an NSA cell, and for the SA cell, the UE may further report the global cell unique identity. The LTE base station records the SA or NSA indication and the global cell unique identity of the SA cell into the neighboring cell list, and for the NSA cell, the LTE base station does not store information thereof into the neighboring cell list.

Scenario 2:

The foregoing steps are performed first, including: configuring, by an LTE base station, the UE to measure a 5G frequency; reporting, by the UE, a measurement result of the 5G frequency, and reporting a cell that has the highest strength and that is not in a neighboring cell list of the LTE base station.

When configuring the measurement for the UE, a base station (that is, the network device) of an LTE cell may configure the UE to perform measurement for the frequency and a physical cell identity (PCI, Physical Cell Identity), and to report an indication of whether the cell is an NSA cell or an SA cell and report a global cell unique identity of the cell.

The UE knows whether the 5G cell is an NSA cell or an SA cell by using the following method: if cell barred in an MIB of the target cell is set to true, the UE reports an indication indicating that the cell is an NSA cell, and at the same time, only the global cell unique identity of the cell is broadcasted in remaining minimum system information (RMSI) of the cell. The UE obtains the global cell unique identity of the cell and reports to the LTE cell. If cell barred in the MIB of the target cell is set to false, the UE reports an indication indicating that the cell is an SA cell, and reports the global cell unique identity of the target cell at the same time.

The adding the identification information and the attribute information corresponding to the NSA cell and/or the SA cell into the neighboring cell list includes: when the LTE cell is a cell supporting dual connectivity, obtaining a global cell unique identity corresponding to the SA cell and/or the NSA cell from the report information, and adding the global cell unique identity corresponding to the SA cell and/or the NSA cell into the neighboring cell list.

That is, if the LTE cell supports EN-DC, the LTE base station records the SA or NSA indication, the global cell unique identity of the SA cell, and the frequency+the PCI of the NSA cell into the neighbor relationship.

When the LTE cell is a cell not supporting dual connectivity, a global cell unique identity corresponding to the SA cell and/or the NSA cell is obtained from the report information, and the global cell unique identity corresponding to the SA cell is added into the neighboring cell list.

That is, if the LTE cell does not support EN-DC, the UE reports whether the cell is an SA cell or an NSA cell, and the UE may further report the global cell unique identity. The LTE base station records the SA or NSA indication and the global cell unique identity of the SA cell into the neighboring cell list, and for the NSA cell, the LTE base station does not store information thereof into the neighboring cell list.

It can be learned that, by using the foregoing solution, the UE can report, to a network side, a missing neighboring cell that is not configured in the neighboring cell list in a current LTE system, and report an SA or NSA indication and identification information of the missing neighboring cell to the network side, so that a network-side LTE system can improve a neighbor relationship of the LTE cell, thereby improving a handover success rate and the configuration rationality of a tight interworking working mode between LTE and NR.

Embodiment 2

This embodiment of the present invention provides a method for configuring a neighboring cell, which is applied to a user equipment. The method includes:

sending report information of a target cell corresponding to a measurement frequency to a network device corresponding to an LTE cell, where the report information of the target cell at least includes identification information and attribute information of an NSA cell and/or an SA cell, and the NSA cell and the SA cell both are cells not in a neighboring cell list of the LTE cell.

Herein, the network device may be a network device managing at least one LTE cell, for example, a base station eNB.

Figure 2:
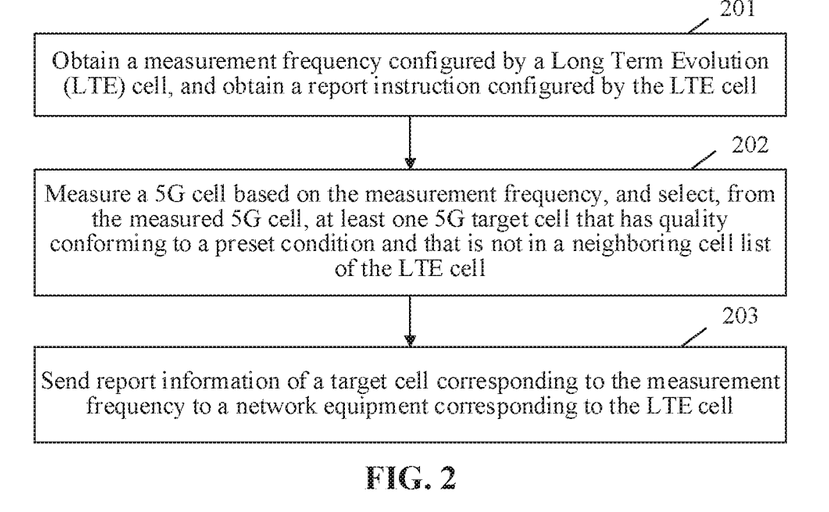
FIG. 2 is a schematic flowchart 2 of a method for configuring a neighboring cell according to an embodiment of the present invention.

Furthermore, with reference to FIG. 2, a detailed processing flow of this embodiment is provided. The method includes:

Step 201: Obtain a measurement frequency configured by the LTE cell, and obtain a report instruction configured by the LTE cell, where the report instruction is used to instruct the UE to report, for the measurement frequency, an NSA and SA indication, a global cell unique identity and/or a PCI of a cell.

Step 202: Measure a 5G cell based on the measurement frequency, and select, from the measured 5G cell, at least one 5G target cell that has quality conforming to a preset condition and that is not in the neighboring cell list of the LTE cell, where the preset condition may be that a signal strength of the 5G cell is higher than a preset threshold, or may be first N cells in a plurality of 5G cells obtained through measurement, for example, first two or more cells. Details are not described herein.

Step 203: Send report information of the target cell corresponding to the measurement frequency to a network device corresponding to the LTE cell, where the report information of the target cell at least includes identification information and attribute information of the NSA cell and/or the SA cell, and the NSA cell and the SA cell both are cells not in the neighboring cell list of the LTE cell.

The measurement frequency is configured to the UE. Specifically, the measurement frequency is configured to the UE by using the LTE cell of the network device, and more specifically, the configured measurement frequency is a frequency of a 5G system. The configured measurement frequency may be a frequency not stored in the neighboring cell list by the network device side of the current LTE cell.

Correspondingly, the UE performs measurement based on the 5G measurement frequency configured by the base station, that is, the LTE cell, and then reports a measurement result to the network device, where the measurement result is included in the report information. Before reporting, the UE may obtain a plurality of cells of the 5G measurement frequency through measurement. The UE screens the plurality of cells and obtains one or more 5G cells with the highest signal strength, and determines whether the one or more 5G cells exist in the neighboring cell list. When the one or more 5G cells do not exist in the neighboring cell list, the UE reports to the network device.

The attribute information includes at least one of the following:

NSA or SA cell indication information of the target cell, information about an interface with a current serving cell, and information about a type of handover with the current serving cell, where the type of handover includes Xn/X2 handover and S1 handover.

Specific processing solution of this embodiment is as follows:

The foregoing steps are performed first, including: configuring, by an LTE base station, the UE to measure a 5G frequency; reporting, by the UE, a measurement result of the 5G frequency, and reporting a cell that has the highest strength (or a plurality of cells that has the highest strength) and that is not in a neighboring cell list of the LTE base station.

When configuring a measurement for the UE, a base station (that is, the network device) of an LTE cell may configure the UE to perform measurement for the frequency and a physical cell identity (PCI, Physical Cell Identity) and to report an indication of whether the cell is an NSA cell or an SA cell and report a global cell unique identity of the cell.

The UE knows whether the 5G cell is an NSA cell or an SA cell by using the following method: obtaining, from a master information block of the 5G target cell, indication information that no switch is allowed to access the cell; when the indication information is true, determining that the 5G target cell is an NSA cell; otherwise, determining that the 5G target cell is an SA cell.

That is, the UE can know whether the 5G cell is an NSA cell or an SA cell by receiving the master information block of the 5G target cell. For example, when cell barred in the MIB is set to true, the UE reports an indication indicating that the cell is an NSA cell; if cell barred in the MIB of the target cell is set to false, the UE reports an indication indicating that the cell is an SA cell, and the UE reports a global cell unique identity of the target cell at the same time.

Furthermore, when the 5G target cell is an SA cell, the global cell unique identity of the SA cell is added into the report information.

If the indication information that no switch is allowed to access the cell in the master information block of the 5G target cell is true, the UE determines that the 5G target cell is an NSA cell.

If there is no RMSI in an NSA cell, a frequency and a PCI of the NSA cell are obtained as a cell identity of the NSA cell.

If there is RMSI in the NSA cell, a global cell unique identity corresponding to the NSA cell is obtained from the RMSI of the NSA cell as the cell identity.

The cell identity of the NSA cell is added into the report information.

It can be learned that, by using the foregoing solution, the UE can report, to a network side, a missing neighboring cell that is not configured in the neighboring cell list in a current LTE system, and report an SA or NSA indication and identification information of the missing neighboring cell to the network side, so that a network-side LTE system can improve a neighbor relationship of the LTE cell, thereby improving a handover success rate and the configuration rationality of a tight interworking working mode between LTE and NR.

Embodiment 3

Figure 3:
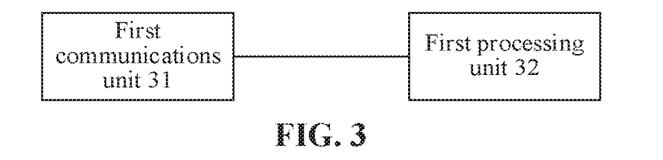
FIG. 3 is a schematic structural diagram of composition of a network device according to an embodiment of the present invention.

This embodiment of the present invention provides a network device, as shown in FIG. 3, including:

a first communications unit 31 for receiving report information, sent by a user equipment UE, of a target cell corresponding to a measurement frequency, where the report information of the target cell at least includes identification information and attribute information of an NSA cell and/or an SA cell, the NSA cell and the SA cell both are cells not in a neighboring cell list of an LTE cell, and the LTE cell is a cell managed by the network device; and a first processing unit 32 for adding the identification information and the attribute information corresponding to the NSA cell and/or the SA cell into the neighboring cell list based on the report information.

Herein, the network device may be a network device managing at least one LTE cell, for example, a base station eNB.

Furthermore, the first communications unit 31 configures the measurement frequency to the UE. Specifically, the measurement frequency is configured to the UE by using the LTE cell of the network device, and more specifically, the configured measurement frequency is a frequency of a 5G system. The configured measurement frequency may be a frequency not stored in the neighboring cell list by the network device side of the current LTE cell.

Correspondingly, the UE performs measurement based on the 5G measurement frequency configured by the base station, that is, the LTE cell, and then reports a measurement result to the network device, where the measurement result is included in the report information. Before reporting, the UE obtain a plurality of cells of the 5G measurement frequency through measurement. The UE screens the plurality of cells and obtains one or more 5G cells with the highest signal strength, and determines whether the one or more 5G cells exist in the neighboring cell list. When the one or more 5G cells do not exist in the neighboring cell list, the UE reports to the network device.

The attribute information includes at least one of the following:

NSA or SA cell indication information of the target cell, information about an interface with a current serving cell, and information about a type of handover with the current serving cell, where the type of handover includes Xn/X2 handover and S1 handover.

The solution is specifically described in the following scenarios:

Scenario 1:

The foregoing processing is performed first, including: configuring, by an LTE base station, the UE to measure a 5G frequency; reporting, by the UE, a measurement result of the 5G frequency, and reporting a cell that has the highest strength and that is not in a neighboring cell list of the LTE base station.

When configuring a measurement for the UE, a base station (that is, the network device) of an LTE cell may configure the UE to perform measurement for the frequency and a physical cell identity (PCI, Physical Cell Identity), and to report an indication of whether the cell is an NSA cell or an SA cell and report a global cell unique identity of the cell.

The UE knows whether the 5G cell is an NSA cell or an SA cell by using the following method: the UE may receive a master information block of the 5G target cell to know whether the 5G cell is an NSA cell or an SA cell. For example, when cell barred in the MIB is set to true, the UE reports an indication indicating that the cell is an NSA cell; if cell barred in the MIB of the target cell is set to false, the UE reports an indication indicating that the cell is an SA cell, and the UE reports a global cell unique identity of the target cell at the same time.

When the LTE cell is a cell supporting dual connectivity and if the report information includes the SA cell, the first processing unit 32 obtains a global cell unique identity corresponding to the SA cell from the report information, and adds the global cell unique identity of the SA cell into the neighboring cell list.

When the LTE cell is a cell supporting dual connectivity and if the report information includes the NSA cell, the first processing unit 32 obtains a frequency and a physical cell identity PCI corresponding to the NSA cell from the report information, and adds the frequency and the PCI corresponding to the NSA cell into the neighboring cell list.

That is, if the LTE cell supports EN-DC, the UE reports whether the cell is an SA cell or an NSA cell, and for the SA cell, the UE may report the global cell unique identity. The LTE base station records the SA or NSA indication, the global cell unique identity of the SA cell, and the frequency+ the PCI of the NSA cell into a neighbor relationship.

When the LTE cell is a cell not supporting dual connectivity and if the report information includes the SA cell, the first processing unit 32 obtains a global cell unique identity corresponding to the SA cell from the report information, and adds the global cell unique identity of the SA cell into the neighboring cell list.

When the LTE cell is a cell not supporting dual connectivity and if the report information includes the NSA cell, information of the NSA cell is not stored.

That is, if the LTE cell does not support EN-DC, the UE reports whether the cell is an SA cell or an NSA cell, and for the SA cell, the UE may further report the global cell unique identity. The LTE base station records the SA or NSA indication and the global cell unique identity of the SA cell into the neighboring cell list, and for the NSA cell, the LTE base station does not store information thereof into the neighboring cell list.

Scenario 2:

The foregoing processing is performed first, including: configuring, by an LTE base station, the UE to measure a 5G frequency; reporting, by the UE, a measurement result of the 5G frequency, and reporting a cell that has the highest strength and that is not in a neighboring cell list of the LTE base station.

When configuring the measurement for the UE, a base station (that is, the network device) of an LTE cell may configure the UE to perform measurement for the frequency and a physical cell identity (PCI, Physical Cell Identity), and to report an indication of whether the cell is an NSA cell or an SA cell and report a global cell unique identity of the cell.

The UE knows whether the 5G cell is an NSA cell or an SA cell by using the following method: if cell barred in an MIB of the target cell is set to true, the UE reports an indication indicating that the cell is an NSA cell, and at the same time, only the global cell unique identity of the cell is broadcasted in RMSI of the cell. The UE obtains the global cell unique identity of the cell and reports to the LTE cell. If cell barred in the MIB of the target cell is set to false, the UE reports an indication indicating that the cell is an SA cell, and reports the global cell unique identity of the target cell at the same time.

When the LTE cell is a cell supporting dual connectivity, the first processing unit 32 obtains a global cell unique identity corresponding to the SA cell and/or the NSA cell from the report information, and adds the global cell unique identity corresponding to the SA cell and/or the NSA cell into the neighboring cell list.

That is, if the LTE cell supports EN-DC, the LTE base station records the SA or NSA indication, the global cell unique identity of the SA cell, and the frequency+the PCI of the NSA cell into the neighbor relationship.

When the LTE cell is a cell not supporting dual connectivity, a global cell unique identity corresponding to the SA cell and/or the NSA cell is obtained from the report information, and the global cell unique identity corresponding to the SA cell is added into the neighboring cell list.

That is, if the LTE cell does not support EN-DC, the UE reports whether the cell is an SA cell or an NSA cell, and the UE may further report the global cell unique identity. The LTE base station records the SA or NSA indication and the global cell unique identity of the SA cell into the neighboring cell list, and for the NSA cell, the LTE base station does not store information thereof into the neighboring cell list.

It can be learned that, by using the foregoing solution, the UE can report, to a network side, a missing neighboring cell that is not configured in the neighboring cell list in a current LTE system, and report an SA or NSA indication and identification information of the missing neighboring cell to the network side, so that a network-side LTE system can improve a neighbor relationship of the LTE cell, thereby improving a handover success rate and the configuration rationality of a tight interworking working mode between LTE and NR.

Embodiment 4

Figure 4:
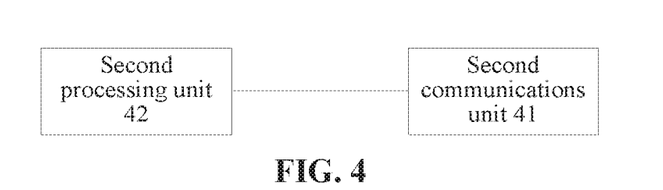
FIG. 4 is a schematic structural diagram of composition of a user equipment according to an embodiment of the present invention.

This embodiment of the present invention provides a user equipment, as shown in FIG. 4, including:

a second communications unit 41 for sending report information of a target cell corresponding to a measurement frequency to a network device corresponding to an LTE cell, where the report information of the target cell at least includes identification information and attribute information of an NSA cell and/or an SA cell, and the NSA cell and the SA cell both are cells not in a neighboring cell list of the LTE cell.

Herein, the network device may be a network device managing at least one LTE cell, for example, a base station eNB.

Furthermore, the second communications unit obtains the measurement frequency configured by the LTE cell, and obtains a report instruction configured by the LTE cell, where the report instruction is used to instruct the UE to report, for the measurement frequency, an NSA and SA indication, a global cell unique identity and/or a PCI of a cell.

The user equipment further includes: a second processing unit 42 for measuring a 5G cell based on the measurement frequency, and selecting, from the measured 5G cell, at least one 5G target cell that has quality conforming to a preset condition and that is not in the neighboring cell list of the LTE cell, where the preset condition may be that a signal strength of the 5G cell is higher than a preset threshold, or may be first N cells in a plurality of 5G cells obtained through measurement, for example, first two or more cells. Details are not described herein.

The second communications unit sends report information of the target cell corresponding to the measurement frequency to a network device corresponding to the LTE cell, where the report information of the target cell at least includes identification information and attribute information of the NSA cell and/or the SA cell, and the NSA cell and the SA cell both are cells not in the neighboring cell list of the LTE cell.

The measurement frequency is configured to the UE. Specifically, the measurement frequency is configured to the UE by using the LTE cell of the network device, and more specifically, the configured measurement frequency is a frequency of a 5G system. The configured measurement frequency may be a frequency not stored in the neighboring cell list by the network device side of the current LTE cell.

Correspondingly, the UE performs measurement based on the 5G measurement frequency configured by the base station, that is, the LTE cell, and then reports a measurement result to the network device, where the measurement result is included in the report information. Before reporting, the UE may obtain a plurality of cells of the 5G measurement frequency through measurement. The UE screens the plurality of cells and obtains one or more 5G cells with the highest signal strength, and determines whether the one or more 5G cells exist in the neighboring cell list. When the one or more 5G cells do not exist in the neighboring cell list, the UE reports the one or more 5G cells to network device.

The attribute information includes at least one of the following:

NSA or SA cell indication information of the target cell, information about an interface with a current serving cell, and information about a type of handover with the current serving cell, where the type of handover includes Xn/X2 handover and S1 handover.

The foregoing processing is performed first, including: configuring, by an LTE base station, the UE to measure a 5G frequency; reporting, by the UE, a measurement result of the 5G frequency, and reporting a cell that has the highest strength (or a plurality of cells that has the highest strength) and that is not in a neighboring cell list of the LTE base station.

When configuring a measurement for the UE, a base station (that is, the network device) of an LTE cell may configure the UE to perform measurement for the frequency and a physical cell identity (PCI, Physical Cell Identity) and to report an indication of whether the cell is an NSA cell or an SA cell and report a global cell unique identity of the cell.

The UE knows whether the 5G cell is an NSA cell or an SA cell by using the following method: obtaining, from a master information block of the 5G target cell, indication information that no switch is allowed to access the cell; when the indication information is true, determining that the 5G target cell is an NSA cell; otherwise, determining that the 5G target cell is an SA cell.

That is, the UE can know whether the 5G cell is an NSA cell or an SA cell by receiving the master information block of the 5G target cell. For example, when cell barred in the MIB is set to true, the UE reports an indication indicating that the cell is an NSA cell; if cell barred in the MIB of the target cell is set to false, the UE reports an indication indicating that the cell is an SA cell, and the UE reports a global cell unique identity of the target cell at the same time. Furthermore, when the 5G target cell is an SA cell, the global cell unique identity of the SA cell is added to the report information.

If the indication information that no switch is allowed to access the cell in the master information block of the 5G target cell is true, the UE determines that the 5G target cell is an NSA cell.

If there is no RMSI in an NSA cell, a frequency and a PCI of the NSA cell are obtained as a cell identity of the NSA cell.

If there is RMSI in the NSA cell, a global cell unique identity corresponding to the NSA cell is obtained from an RMSI of the NSA cell as the cell identity.

The cell identity of the NSA cell is added into the report information.

It can be learned that, by using the foregoing solution, the UE can report, to a network side, a missing neighboring cell that is not configured in the neighboring cell list in a current LTE system, and report an SA or NSA indication and identification information of the missing neighboring cell to the network side, so that a network-side LTE system can improve a neighbor relationship of the LTE cell, thereby improving a handover success rate and the configuration rationality of a tight interworking working mode between LTE and NR.

Figure 5:
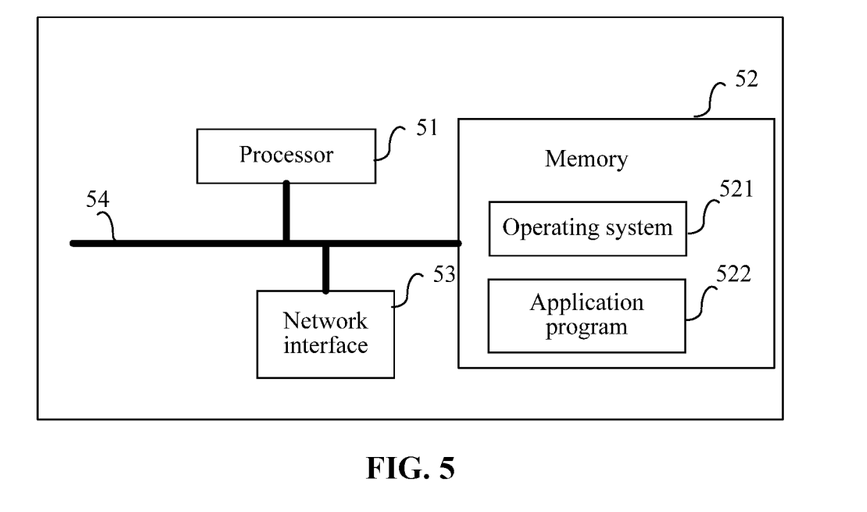
FIG. 5 is a schematic diagram of a hardware architecture according to an embodiment of the present invention.

The embodiments of the present invention further provide a hardware composition architecture of a user equipment or a network device, as shown in FIG. 5, including: at least one processor 51, a memory 52, and at least one network interface 53. All components are coupled together by a bus system 54. It is understood that the bus system 54 is used to implement connection and communications among these components. The bus system 54 includes a power bus, a control bus and a state signal bus in addition to a data bus. However, for clarity, all buses are labeled as the bus system 54 in FIG. 5.

It is understood that the memory 52 in the embodiment of the present invention may be a volatile memory or a non-volatile memory, or may include both a volatile memory and a non-volatile memory.

In some implementations, the memory 52 stores the following elements, an executable module or a data structure, or subsets of thereof, or extended sets thereof:

an operating system 521 and an application program 522.

The processor 51 is configured to: process the steps of the method in the foregoing Embodiment 1 or 2, and details are not described herein again.

The embodiments of the present invention provide a computer storage medium. The computer storage medium stores a computer executable instruction, and the computer executable instruction implements the steps of the method in the foregoing Embodiment 1 or 2 when being executed.

The foregoing apparatus in the embodiments of the present invention may further be stored in a computer readable storage medium if the apparatus is implemented in a form of a software functional module and is sold or used as an independent product. Based on such an understanding, the technical solution of the embodiments of the present invention is essentially or the part that contributes to the prior art can be embodied in a form of a software product, the computer software product is stored in a storage medium and includes several instructions to enable a computer device (which may be a personal computer, a server, or a network device) to perform all or part of the method in each embodiment of the present invention. The foregoing storage medium includes: any medium that can store program code, such as a USB flash disk, a removable hard disk, a read-only memory (ROM, Read Only Memory), a magnetic disk, a compact disc, or the like. Thus, the embodiments of the present invention are not limited to any particular combination of hardware and software.

Correspondingly, the embodiments of the present invention further provide a computer storage medium storing a computer program, where the computer program is configured to perform a data scheduling method in the embodiments of the present invention.

Although preferred embodiments of the present invention have been disclosed for the purpose of illustration, a person skilled in the art will be aware that various improvements, additions and replacements are also possible. Therefore, the scope of the present invention shall not be limited to the foregoing embodiments.

The invention claimed is:

1. A method for configuring a neighboring cell, applied to a user equipment (UE), comprising:
   sending report information of a target cell corresponding to a measurement frequency to a network device corresponding to a Long Term Evolution (LTE) cell,
   wherein the report information of the target cell at least comprises a physical cell identity (PCI) and attribute information of at least one of a non-stand-alone (NSA) cell or a stand-along (SA) cell, and the NSA cell and the SA cell both are cells not in a neighboring cell list of the LTE cell,
   wherein the attribute information comprises NSA or SA cell indication information of the target cell, information of a type of handover with the current serving cell, and information of an interface with a current serving cell, wherein the type of handover comprises Xn/X2 handover and S1 handover.

2. The method according to claim 1, further comprising:
   obtaining the measurement frequency configured by the LTE cell; and
   obtaining a report instruction configured by the LTE cell, wherein the report instruction is used to instruct the UE to report an NSA and SA cell indication as well as at least one of a global cell unique identity or a PCI of a cell for the measurement frequency.

3. The method according to claim 2, wherein after the obtaining the measurement frequency configured by the LTE cell, the method further comprises:
   measuring a 5G cell based on the measurement frequency, and selecting, from the measured 5G cell, at least one 5G target cell that has quality conforming to a preset condition and that is not in the neighboring cell list of the LTE cell.

4. A network device, wherein the network device comprises a processor, a memory, and a network interface, wherein one or more computer programs are stored in the memory and are configured to be executed by the processor, when the one or more computer programs are executed, the processor is configured to:

receive through the network interface, sent by a user equipment (UE), report information of a target cell corresponding to a measurement frequency, wherein the report information of the target cell at least comprises a physical cell identity (PCI) and attribute information of at least one of a non-stand-alone (NSA) cell or a stand-alone (SA) cell, the NSA cell and the SA cell both are cells not in a neighboring cell list of a Long Term Evolution (LTE) cell, and the LTE cell is a cell managed by the network device; and add the identification information and the attribute information corresponding to the at least one of the NSA cell or the SA cell into the neighboring cell list based on the report information, wherein the attribute information comprises NSA or SA cell indication information of the target cell, information of a type of handover with the current serving cell, and information of an interface with a current serving cell, wherein the type of handover comprises Xn/X2 handover and S1 handover.

5. The network device according to claim 4, wherein the processor is specifically configured to configure the measurement frequency to the UE.

6. The network device according to claim 4, wherein the processor is specifically configured to:
in response to the LTE cell being a cell supporting dual connectivity and the report information comprising the SA cell, obtain a global cell unique identity corresponding to the SA cell from the report information, and add the global cell unique identity of the SA cell into the neighboring cell list.

7. The network device according to claim 4, wherein the processor is specifically configured to:
in response to the LTE cell being a cell supporting dual connectivity and the report information comprising the NSA cell, obtain a frequency and a PCI corresponding to the NSA cell from the report information, and add the frequency and the PCI corresponding to the NSA cell into the neighboring cell list.

8. The network device according to claim 4, wherein the processor is specifically configured to:
in response to the LTE cell being a cell not supporting dual connectivity and the report information comprising the SA cell, obtain a global cell unique identity corresponding to the SA cell from the report information, and add the global cell unique identity of the SA cell into the neighboring cell list.

9. The network device according to claim 4, wherein the processor is specifically configured to:
in response to the LTE cell being a cell not supporting dual connectivity and the report information comprising the NSA cell, not store information of the NSA cell.

10. The network device according to claim 4, wherein the processor is specifically configured to:
in response to the LTE cell being a cell supporting dual connectivity, obtain a global cell unique identity corresponding to the at least one of the SA cell or the NSA cell from the report information, and add the global cell unique identity corresponding to the at least one of the SA cell or the NSA cell into the neighboring cell list.

11. The network device according to claim 4, wherein the processor is specifically configured to:
in response to the LTE cell being a cell not supporting dual connectivity, obtain a global cell unique identity corresponding to the at least one of the SA cell or the NSA cell from the report information, and add the global cell unique identity corresponding to the SA cell into the neighboring cell list.

12. A user equipment (UE), wherein the user equipment comprises a network interface, the network interface is configured to:

send report information of a target cell corresponding to a measurement frequency to a network device corresponding to a Long Term Evolution (LTE) cell, wherein the report information of the target cell at least comprises a physical cell identity (PCI) and attribute information of at least one of a non-stand-alone (NSA) cell or a stand-alone (SA) cell, and the NSA cell and the SA cell both are cells not in a neighboring cell list of the LTE cell, wherein the attribute information comprises NSA or SA cell indication information of the target cell, information of a type of handover with the current serving cell, and information of an interface with a current serving cell, wherein the type of handover comprises Xn/X2 handover and S1 handover.

13. The user equipment according to claim 12, wherein the network interface is specifically configured to:
obtain, the measurement frequency configured by the LTE cell, and obtain a report instruction configured by the LTE cell, wherein the report instruction is used to instruct the UE to report an NSA and SA indication as well as at least one of a global cell unique identity or a PCI of a cell for the measurement frequency.

14. The user equipment according to claim 13, wherein the user equipment further comprises a processor, wherein the processor is configured to:
measure a 5G cell based on the measurement frequency, and select, from the measured 5G cell, at least one 5G target cell that has quality conforming to a preset condition and that is not in the neighboring cell list of the LTE cell.

15. The user equipment according to claim 14, wherein the processor is specifically configured to:
obtain, from a master information block of the 5G target cell, indication information that no switch is allowed to access the cell; and in response to the indication information being true, determine that the 5G target cell is an NSA cell; otherwise, determine that the 5G target cell is an SA cell.

16. The user equipment according to claim 15, wherein the processor is specifically configured to:
in response to the 5G target cell being an SA cell, add a global unique identity of the SA cell into the report information.

17. The user equipment according to claim 15, wherein the processor is specifically configured to:
in response to the indication information that no switch is allowed to access the cell in the master information block of the 5G target cell being true, determine that the 5G target cell is an NSA cell;
in response to there being no remaining minimum system information (RMSI) in an NSA cell, obtain a frequency and a PCI of the NSA cell as a cell identity of the NSA cell;

in response to there being RMSI in the NSA cell, obtain, from the RMSI of the NSA cell, a global cell unique identity corresponding to the NSA cell as the cell identity; and add the cell identity of the NSA cell into the report information.

\* \* \* \* \*